US008285936B2

(12) United States Patent  
Roberts et al.

(10) Patent No.: US 8,285,936 B2  
(45) Date of Patent: Oct. 9, 2012

(54) CACHE MEMORY WITH POWER SAVING STATE

(75) Inventors: David Andrew Roberts, Burton-On-Trent (GB); Trevor Nigel Mudge, Ann Arbor, MI (US); Thomas Friedric Wenisch, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 539 days.

(21) Appl. No.: 12/588,592

(22) Filed: Oct. 20, 2009

(65) Prior Publication Data

US 2011/0093654 A1    Apr. 21, 2011

(51) Int. Cl.
  G06F 12/00  (2006.01)
  G06F 13/00  (2006.01)
  G06F 13/28  (2006.01)
(52) U.S. Cl. .................. 711/118; 711/113; 713/320
(58) Field of Classification Search .............. 711/118
  See application file for complete search history.

(56) References Cited

U.S. PATENT DOCUMENTS

| 2009/0182949 | A1* | 7/2009 | Begon et al. ............ 711/133 |
| 2010/0122031 | A1* | 5/2010 | Strumpen et al. ........ 711/122 |
| 2011/0283071 | A1* | 11/2011 | Yokoya et al. ........... 711/162 |
| 2012/0096295 | A1* | 4/2012 | Krick ...................... 713/324 |

OTHER PUBLICATIONS

Shin et al., "Improving Energy Efficiency by Making DRAM Less Randomly Accessed", *Low Power Electronics and Design*, 2005, ISLPED '05 (Proceedings of the 2005 International Symposium), Aug. 8-10, 2005, pp. 393-398.

Zheng et al., "Mini-Rank: Adaptive DRAM Architecture for Improving Memory Power Efficiency", *Micorarchitecture*, 2008, MICRO-41, 41$^{st}$ IEEE/ACM Symposium, Nov. 8-12, 2008, pp. 210-221.
Ye et al., "Prototyping a Hybrid Main Memory Using a Virtual Machine Monitor", *20$^{th}$ IEEE Conference on Computer Design* (ICCD 2008), Oct. 12-15, 2008, pp. 272-279.
Park et al., "Energy-Aware Demand Paging on NAND Flash-based Embedded Storages", *ISLPED '04*, Aug. 9-11, 2004, pp. 338-343.
Kaxiras et al., "Cache Decay: Exploiting Generational Behavior to Reduce Cache Leakage Power", *2001 IEEE*, 12 pages.
Kgil et al., "FlashCache: A NAND Flash Memory File Cache for Low Power Web Servers", *Cases '06*, Oct. 23-25, 2006, pp. 103-112.

* cited by examiner

*Primary Examiner* — Brian Peugh  
*Assistant Examiner* — Prasith Thammavong  
(74) *Attorney, Agent, or Firm* — Nixon & Vanderhye P.C.

(57) ABSTRACT

A data processing apparatus 1 comprises data processing circuitry 2, a memory 8 for storing data and a cache memory 5 for storing cached data from the memory 8. The cache memory 5 is partitioned into cache segments 12 which may be individually placed in a power saving state by power supply circuitry 15 under control of power control circuitry 22. The number of segments which are active at any time may be dynamically adjusted in dependence upon operating requirements of the processor 2. An eviction selection mechanism 35 is provided to select evictable cached data for eviction from the cache. A cache compacting mechanism 40 is provided to evict evictable cached data from the cache and to store non-evictable cached data in fewer cache segments than were used to store the cached data prior to eviction of the evictable cached data. Compacting the cache enables at least one cache segment that, following eviction of the evictable cached data, is no longer required to store cached data to be placed in the power saving state by the power supply circuitry.

33 Claims, 9 Drawing Sheets

Eviction selection

Cache allocation

CACHE MEMORY WITH POWER SAVING STATE

BACKGROUND OF THE INVENTION

1. Field of the Invention

This invention relates to the field of data processing devices. More particularly, the invention relates to data processing devices having a memory for storing data.

2. Description of the Prior Art

It is known to provide data processing systems with a memory for storing code and data. In such systems, memory power consumption can be an important issue. For example, dynamic random access memory (DRAM) can contribute up to 35% of total energy consumption in some systems. Memory power consumption is a particularly important issue for server systems, where cooling costs should be kept low, and for battery powered devices, where it is desirable to prolong the battery lifetime.

Non-volatile memory technologies are now available which consume much less idle power than DRAM. For example, for flash memory devices static power consumption is of the order of tens of microwatts per gigabyte of stored data, as opposed to hundreds of milliwatts per gigabyte for DRAM. However, for non-volatile memory devices the access latency is several orders of magnitude greater than for DRAM. This means that replacing DRAM with flash memory, for example, would severely affect system performance, wasting energy as tasks would be completed more slowly. This is particularly important for write accesses, as for example, DRAM can be written to in 55 ns, compared with 35 μs for multi-level cell phase-change random access memory (PCRAM), 200 μs for single-level cell NAND flash, and 800 μs for multi-level cell NAND flash. This means that at present non-volatile memory cannot be used as a direct replacement for DRAM memory.

Ye et al have proposed a hybrid memory system in "Prototyping a Hybrid Main Memory Using a Virtual Machine Monitor", Proceedings of the 26$^{th}$ International Conference on Computer Design, ICCD 2008, 12-15 Oct. 2008, Lake Tahoe, Calif., USA, pages 272 to 279. They propose a system having a first-level memory of conventional DRAM and a second-level memory comprising non-volatile memory such as flash memory. However, they report that in order to prevent system performance being degraded by more than 10%, at least 75% of the total memory capacity must be made up of DRAM. This does not provide significant energy savings.

The present invention seeks to address this problem and provide a memory system which has a low power consumption but which also provides rapid access to stored data.

Zheng et al have proposed a DRAM system partitioned into "mini ranks" (see Microarchitecture, 2008. MICRO-41. 2008 41$^{st}$ IEEE/ACM Symposium on, 8-12 Nov. 2008, pages 210-221).

SUMMARY OF THE INVENTION

Viewed from one aspect the present invention provides a data processing apparatus comprising:

data processing circuitry for processing data;

a memory for storing data for use by said data processing circuitry;

a cache memory comprising a plurality of cache segments and configured to store cached data from said memory;

power supply circuitry for selectively supplying each of said cache segments with power;

an eviction selection mechanism for selecting evictable cached data for eviction from said cache memory;

a cache compacting mechanism configured to perform cache compaction by evicting said evictable cached data from said cache memory and storing non-evictable cached data in fewer cache segments than were used to store said cached data prior to eviction of said evictable cached data; and power control circuitry configured to control said power supply circuitry to place in a power saving state at least one of said cache segments that, following eviction of said evictable cached data by said cache compacting mechanism, are not required to store cached data.

The present technique provides a system having a memory for storing data and a cache memory for storing cached data from the memory. The cache memory is partitioned into a plurality of cache segments which can selectively be supplied with power by power supply circuitry. The power supply circuitry has a fine-grained control over the power supply to each cache segment. This is useful, because the present technique recognises that typically only a small amount of data will need to be accessed regularly by the data processing circuitry. Most data stored in the main memory is accessed infrequently. On the few occasions that a large amount of data is being used by the data processing circuitry, a large number of cache segments can be powered up and used to store cached versions of this data. However, when this data is no longer needed, the power control circuitry can control the power supply circuitry to place cache segments that are not required to store cached data in a power saving state in which power is conserved.

The present technique also provides the system with a mechanism for managing cached data in a way that ensures that data which is used infrequently by the data processing circuitry is not stored in the cache unnecessarily and that power efficient use is made of those cache segments that remain powered. This mechanism comprises an eviction selection mechanism for selecting evictable cached data for eviction from the cache memory to the main memory, and a cache compacting mechanism configured to perform cache compaction by evicting the evictable cached data from the cache memory and storing non-evictable cached data in fewer cache segments than were used to store the cached data prior to eviction of the evictable cached data. When cached data is evicted from the cache, the cache compacting mechanism packs the remaining data into fewer, more densely packed, cache segments so that at least one cache segment is no longer required to store cached data. The at least one cache segment is then placed in a power saving state by the power control circuitry. This dynamic adjustment of the number of active cache segments enables the cache memory to store a large amount of cache data when necessary (so that data can be accessed more rapidly than if the data was stored in the memory), while also being able to conserve energy by powering down unused cache segments when only a small amount of cache storage capacity is needed.

The memory typically has a lower static power consumption per amount of stored data than the cache memory. This means that if frequent access to data by the data processing circuitry is not necessary, then power can be conserved by evicting that data from the cache and storing the data in the memory only.

Furthermore, in the case where the memory may have a higher energy consumption per memory access than the cache (e.g. for PCRAM memory devices), energy can be conserved by reducing the number of memory accesses.

After evicting the evictable cached data from the cache memory, the cache compacting mechanism may be configured to move at least some non-evictable cached data to a different cache segment, such that fewer cache segments are required to store the non-evictable cached data than were required prior to eviction of the evictable cached data.

Although it is possible that in some situations an entire cache segment of cached data is evicted to the main memory at the same time, in most cases when data is evicted from a cache segment some non-evictable cached data will remain in that cache segment. In such cases, then the number of cache segments required to store the remaining cached data can be reduced by moving at least some non-evictable cached data to a different cache segment. In this way, non-evictable cached data scattered across several cache segments can be packed into fewer, more densely packed, segments. This enables more cache segments to be powered down following cache compaction.

When the power control circuitry controls the power supply circuitry to place at least one cache segment in a power saving state, the at least one of said cache segments may comprise all of the cache segments that, following eviction of the evictable cached data by said cache compaction mechanism, are not required to store cached data. This obtains a greater power saving.

The data processing apparatus may further comprise an access monitoring mechanism for monitoring a cache access interval between successive accesses to cached data stored in the cache memory. Monitoring cache access intervals means that the management of cached data can be done intelligently in response to the actual operation of the system. By knowing the actual access timings for data, the system can control the cache memory to cache only the energy-efficient working set of data used by a particular application that is currently active, while data not being used by the application is retained in the low-power main memory.

The eviction selection mechanism may be configured in various different ways. These techniques may be used individually, or in combination.

One technique for eviction selection is that, when cached data is accessed from the cache memory, the eviction selection mechanism is configured to select the accessed cached data as evictable cached data in dependence upon whether the cache access interval monitored by the access monitoring mechanism is greater than a cache access interval threshold. In this way, infrequently used data can be identified and selected for eviction. Reviewing whether cached data should be evicted each time that data is accessed from the cache provides an efficient way of implementing the eviction mechanism without affecting system performance.

The eviction selection mechanism may be configured to: increment a confidence counter if the cache access interval is greater than the cache access interval threshold, and select the accessed cached data as the evictable cached data if the confidence counter is greater than the confidence threshold. This algorithm helps to ensure that cached data accessed at intervals that are consistently greater than the cache access interval threshold are selected for eviction. Maintaining the confidence counter avoids data accessed once with an unusually long inter-access interval, but which is normally used more frequently by the processor, being evicted from the cache.

Particularly useful values for the cache access interval threshold are: at least a read latency of the memory, and at least a write latency of the memory. If the inter-access interval to a particular piece of data in the cache is greater than a read or write latency of the main memory, then the demand for that piece of data can be satisfied even if the data is not cached and is stored only in the memory. Thus, by setting the cache access interval threshold to have a minimum value of either the read or write latency of the memory, it is ensured that the cached data is the data for which system performance would suffer if it was not stored in the cache memory.

A similar technique to the eviction selection technique may be used to determine whether a particular piece of data should be cached in the first place. In this case, the access monitoring mechanism is further configured to monitor a memory access interval between successive accesses to data stored in the memory, and the data processing apparatus further comprises a cache allocation mechanism configured, when data is accessed from said memory, to select said accessed data for allocation to said cache memory in dependence upon whether said memory access interval monitored by said access monitoring mechanism is less than a memory access interval threshold. If the memory access interval for a particular piece of data is less than the memory access interval threshold then this means that the processing speed would be quicker if that data is cached than if it is stored in memory only. Therefore, the data would be selected for allocation to the cache memory so as to improve system performance.

In one example of the cache allocation mechanism, the mechanism is configured to increment a confidence counter if said memory access interval is less than said memory access interval threshold; and select said accessed data for allocation to said cache memory if said confidence counter is greater than a confidence threshold. This mechanism ensures that pages with memory access intervals that are consistently too short to be satisfied by main memory are cached in the cache memory.

Again, useful values for the memory access interval threshold include: at least a read latency of said memory, and at least a write latency of said memory.

When the cache allocation mechanism allocates data to the cache memory (for example, following a cache miss), it selects a cache segment and cache location for storing the newly cached data. The cache allocation mechanism may select a cache segment and location in a way that promotes cache compaction by favouring segments that are not in the power saving state over segments that are currently powered down, thus avoiding turning on new chips.

Locations in currently powered-on cache segments may be selected in the following order of preference: invalid locations, then clean locations storing evictable data, then dirty locations storing evictable data. Of the clean or dirty locations, a particular location can be selected using a least recently used (LRU) or random selection algorithm, for example. A new cache segment is powered up if no locations are available in an already powered segment. Since data is preferably allocated to already powered cache segments, this causes the powered-on cache segments to become more densely packed with data. Selecting invalid or clean locations in preference to dirty locations helps to reduce the number of write backs and thus reduces bus traffic and prolongs the memory lifetime.

One way in which the allocation mechanism may be configured to perform victim selection is by executing the following steps:

(i) setting as a candidate cache segment the cache segment having the most cache locations storing non-evictable cached data;

(ii) selecting from said candidate cache segment an invalid cache location;

(iii) if (ii) is not possible, then selecting from said candidate cache segment a clean cache location storing evictable cached data;

(iv) if (ii) and (iii) are not possible, then selecting from said candidate cache segment a dirty cache location storing evictable cached data;
(v) if (ii), (iii) and (iv) are not possible, then setting as said candidate cache segment the cache segment having the next-most cache locations storing non-evictable cached data, and repeating steps (ii), (iii) and (iv);
(vi) if (ii), (iii), (iv) and (v) are not possible, then controlling said power control circuitry to bring out of said power saving state a cache segment that is currently in said power saving state, and selecting as said candidate cache location an invalid cache location of the cache segment that has been brought out of said power saving state.

Another way in which the eviction selection mechanism can be implemented is to configure the eviction selection mechanism to select cached data as said evictable cached data if said access monitoring mechanism determines that an interval since the last access to said cached data is greater than a predetermined threshold. This means that data which has not been accessed for some time by the data processing apparatus is marked for eviction. Data may stop being accessed if, for example, the data processing apparatus is inactive or idle for a period, or if the application being executed by the data processing apparatus changes. The selection of evictable cached data based on the determination of the interval since the last access may be performed periodically by the access monitoring mechanism.

It is also possible to configure the data processing circuitry to provide a signal to the eviction selection mechanism indicating that a subset of cache data will no longer be used by the data processing circuitry, and to configure the eviction selection mechanism to be responsive to that signal to select said subset of cache data as said evictable cache data. In this way the data processing circuitry can notify the cache if it is no longer going to use some cached data. Providing this signal to the eviction selection mechanism enables the eviction selection mechanism to select that data for eviction sooner than if it had to wait until a predetermined period of time has passed to discover that the data is no longer being used. Subsequent cache compaction can then improve the energy efficiency of the cache.

The data processing circuitry may also provide a signal 'pinning' cached data in the cache so that it never gets evicted. This could be used, for example, to prevent streaming data that is known to be accessed and then deleted soon afterwards from ever being written back to main memory. Avoiding unnecessary writes to memory can improve the lifetime of the memory, especially where the memory comprises a memory technology such as flash memory, which can be erased only a limited number of times.

The cache compacting mechanism may be configured to perform the cache compaction periodically. It is particularly advantageous to arrange for the cache compaction performed by the cache compacting mechanism to be independent from the selection of evictable cache data by the eviction selection mechanism. This enables the cache compacting mechanism to take a more global view of cache compaction and makes the cache compaction more efficient than if cache compaction was performed immediately every time data is selected for eviction.

One way of making the cache compacting mechanism more efficient is to configure the cache compacting mechanism to determine whether eviction of the currently selected evictable cached data would allow the non-evictable cached data to be stored in fewer segments than are currently being used. Cache compaction is then performed if it is identified that eviction of the evictable cached data would allow the non-evictable cached data to be stored in fewer cache segments. If there is not enough evictable cached data to enable at least one cache segment to be placed in the power saving state, then the cache compacting mechanism does not perform cache compaction since eviction of the evictable cached data would not provide a power saving and would merely result in the access times to that data becoming longer, thus slowing down any processes that require access to the evictable data. If this is the case, then the evictable cached data is retained in the cache memory so as to retain the quick access time for future accesses. The cache compaction mechanism waits until there is enough evictable cached data to allow the non-evictable cached data to be stored in fewer cache segments before performing cache compaction.

One way in which the cache compacting mechanism may be configured to perform cache compaction is by executing the following steps:
(i) identifying whether eviction of said evictable cached data would allow said non-evictable cached data to be stored in fewer cache segments than are currently being used to store said cached data; and
(ii) if it is identified that eviction of said evictable cached data would allow said non-evictable cached data to be stored in fewer cache segments than are currently being used to store said cached data, then performing steps (a) to (e):
(a) selecting as a source cache segment a cache segment having the fewest cache locations that are storing non-evictable cached data;
(b) selecting as a destination cache segment a cache segment having the most cache locations that are storing non-evictable cached data;
(c) evicting evictable cached data from said source cache segment and setting as invalid cache locations the cache locations from which said evictable cached data is evicted;
(d) transferring at least a portion of said non-evictable cached data stored in said source cache segment to at least one cache location of said destination cache segment, each said at least one cache location being one of an invalid cache location of said destination cache segment and a cache location of said destination that is storing evictable cached data; and
(e) repeating steps (a) to (e) until no more cached data can be transferred to another cache segment.

This algorithm acts to pack non-evictable cached data into fewer segments. Non-evictable cached data is migrated from cache segments storing less non-evictable cached data to segments storing more non-evictable cached data until such migrations are no longer possible, whereupon any segments that are no longer required to store cached data will be placed in the power saving state by the power control circuitry. When data is evicted from a cache segment then the evicted data may need to be written back to memory before the corresponding cache location is set to be an invalid cache location, as the evicted data could have been modified by the processor.

The compaction algorithm described above could be modified to transfer any evictable data in the source cache segment to another cache segment rather than invalidating the evictable locations. The evictable data could replace invalid or less frequently accessed non-evictable cache locations in other occupied cache segments.

The data processing circuitry may generate data, or read data from a backing store (e.g. a disk) during its data processing operations. If this is the case, a warm-up performance lag can be avoided by arranging for the cache to store the data generated by the data processing circuitry when it is first generated. Infrequently used generated data can then gradually be demoted down to the low-power memory. Placing generated data in the cache initially helps to avoid the performance hit that would occur if the data was not cached (since otherwise several further accesses would be required before the data would be placed in the cache). A bit in the page table entry can be set to indicate that a page of data has been allocated to the cache but not to memory. This bit indicates that when this data is evicted from the cache then it will need to be written back to memory.

The eviction selection mechanism, the cache compacting mechanism and the access monitoring mechanism may be implemented in various different ways. For example they could be provided by at least one of a memory management circuitry for managing the cache memory and the memory, a dedicated cache compaction circuitry for managing cache compaction (but not necessarily other cache functions), software algorithms executed by the data processing circuitry, and software algorithms executed by a management processor. It will be appreciated that a combination of these options is also possible, for example one of these mechanisms could be implemented by software algorithms implemented by the data processing circuitry, while other of the mechanisms are implemented by a dedicated cache compacting circuitry.

It will be appreciated that various different technologies could be used for the cache memory and the memory. A particularly advantageous technology to use for the cache memory is dynamic random access memory (DRAM), as the access times for DRAM are several orders of magnitude less than for non-volatile memory technologies. Furthermore, DRAM can filter accesses to a memory which has a higher access energy (e.g. PCRAM).

The memory may comprise at least one of: dynamic random access memory having a lower static power consumption per amount of stored data than the dynamic random access memory of the cache memory, flash memory, magnetic random access memory (MRAM), and phase change random access memory (PRAM). These memory technologies all have a much lower static power consumption per amount of stored data than the DRAM used in the cache memory, and so by using one or more of these technologies as the main memory the power consumption of the system can be reduced. It will be appreciated that multiple types of memory technology could be used for the memory.

The cache memory and the memory may be arranged in separate memory modules.

Alternatively, the data processing apparatus may comprise at least one hybrid memory module, each hybrid memory module comprising a plurality of cache locations of the cache memory and a plurality of memory locations of the memory. Using a hybrid memory module can help to reduce the bus bandwidth required to transfer data between the cache memory and the memory. In a hybrid memory module, data may be transferred internally between cache locations and memory locations, rather than requiring data to be sent by a system bus to a separate memory module.

The hybrid memory module may be arranged to comprise a plurality of blocks, each block comprising at least some of the cache locations and at least some of the memory locations. In this arrangement, each block of main memory locations has a local cache for caching data from that block of memory locations.

It is also possible to arrange that the hybrid memory module comprises a plurality of blocks, at least one of the plurality of blocks being a memory block dedicated to providing memory locations and at least one of the plurality of blocks being a cache block dedicated to providing cache locations. In this way, caching of data from the memory locations of the hybrid memory module is managed centrally in the cache block. Having separate cache and memory blocks may be advantageous if a memory technology such as flash is used. Flash memory typically has only a limited lifetime because data may only be erased from each flash memory location a limited number of times. For this reason, flash memory devices often use wear levelling techniques to cycle the order in which the flash memory locations are used so that for each location the probability that that location is used within a given period of time is the same. Generally, wear levelling will be implemented more efficiently in a large block of flash memory locations than in separate smaller blocks, and so a hybrid memory module comprising dedicated memory blocks will be able to exploit the wear levelling better than a hybrid module with blocks having a mixture of cache locations and memory locations.

The apparatus may be arranged to comprise:
an eviction status bit store for storing a plurality of eviction status bits, each eviction status bit being associated with a corresponding cache location of said cache memory and having an evictable state indicating that the corresponding cache location contains evictable cached data and a non-evictable state indicating that the corresponding cache location contains non-evictable cached data; and
access monitoring circuitry for monitoring access to cache locations of said cache memory and maintaining said eviction status bits in said eviction status bit store; wherein:
said access monitoring circuitry is configured to set all of said eviction status bits to said evictable state following cache compaction being performed by said cache compaction circuitry;
said access monitoring circuitry is responsive to a read to a read target location occurring within a read access window to set the eviction status bit corresponding to said read target location to said non-evictable state;
said access monitoring circuitry is responsive to a write to a write target location within a write access window to set the eviction status bit corresponding to said write target location to said non-evictable state; and
said evictable cached data is cached data stored in cache locations for which the corresponding eviction status bit is in said evictable state when said cache compacting mechanism performs said cache compaction.

This technique for identifying evictable data uses little storage overhead, as only a single status bit per cache location is needed. Also, when a location is accessed only a single bit is modified by the access monitoring circuitry.

The eviction status bit store and access monitoring circuitry may be provided as part of a memory module that forms part of said cache memory. This is advantageous because it means that the cache memory is easily scalable. If more cache memory locations are required, then one or more extra memory modules can be added to the cache memory. Since the eviction status bit store and access monitoring circuitry are provided as part of the memory module(s), the cache memory will now contain the storage and monitoring circuitry appropriate for handling the increased number of eviction status bits corresponding to the increased cache capacity.

The eviction status bit store may include an eviction status history store for storing a plurality of sets of eviction status history bits, each set of eviction status history bits having values corresponding to values of the eviction status bits at a respective instance in the past. By periodically storing copies of the eviction status bits for later access by the control algorithms, it is possible to determine longer inter-access intervals. This information could be used, for example, to help avoid thrashing that can occur if a particular piece of data keeps being evicted from the cache and then re-allocated to the cache soon afterwards.

Viewed from a further aspect, the present invention provides a data processing apparatus comprising:

data processing means for processing data;

memory means for storing data for use by said data processing means;

cache memory means for storing cached data from said memory means, said cache memory means comprising a plurality of cache segment means;

power supply means for selectively supplying each of said cache segment means with power;

eviction selection means for selecting evictable cached data for eviction from said cache memory means;

cache compacting means configured to perform cache compaction by evicting said evictable cached data from said cache memory means and storing non-evictable cached data in fewer cache segment means than were used to store said cached data prior to eviction of said evictable cached data; and power control means configured to control said power supply means to place in a power saving state at least one of said cache segment means that, following eviction of said evictable cached data by said cache compacting means, are not required to store cached data.

Viewed from another aspect, the present invention provides a method for a data processing apparatus comprising data processing circuitry for processing data, a memory for storing data for use by said data processing circuitry, and a cache memory comprising a plurality of cache segments and configured to store cached data from said memory; said method comprising the steps of:

selecting evictable cached data for eviction from said cache memory;

performing cache compaction by evicting said evictable cached data from said cache memory and storing non-evictable cached data in fewer cache segments than were used to store said cached data prior to eviction of said evictable cached data; and placing in a power saving state at least one of said cache segments that, following eviction of said evictable cached data, are not required to store cached data.

The above, and other objects, features and advantages of this invention will now be apparent from the following detailed description of illustrative embodiments which is to be read in connection with the accompanying drawings.

DESCRIPTION OF THE PREFERRED EMBODIMENTS

Figure 1:
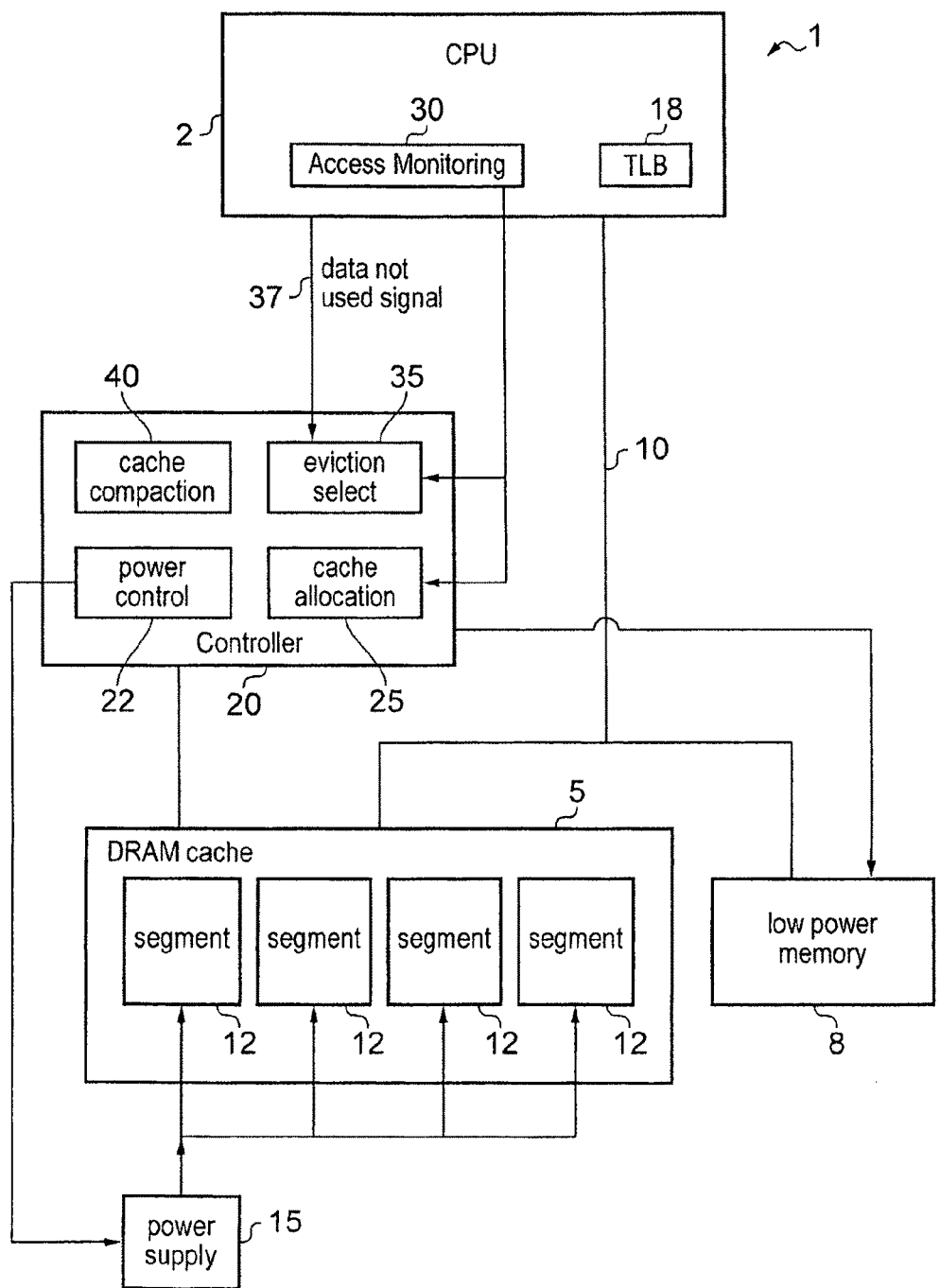
FIG. 1 schematically illustrates a data processing apparatus according to an example embodiment of the present technique.

FIG. 1 schematically illustrates a data processing apparatus 1 according to one example embodiment of the present technique. It will be appreciated that, as well as the elements illustrated in FIG. 1, the data processing apparatus 1 could comprise further parts that have not been illustrated for clarity.

The apparatus 1 comprises a processor 2 coupled to a DRAM cache 5 and a memory 8 via a system bus 10. The cache 5 is partitioned into cache segments 12, each cache segment comprising cache locations for storing cached versions of data from the main memory 8. The cache 5 is powered by a power supply 15 which has fine-grained (e.g. individual) control over the power supplied to each cache segment 12.

The main memory 8 is a low power memory having lower static power consumption per amount of stored data than the DRAM cache 5. The memory 8 may include flash memory, magnetic random access memory (MRAM), phase change random access memory (PRAM) and/or low-power dynamic random access memory (DRAM having a lower power consumption per amount of stored data than the DRAM forming the cache 5). It will be appreciated that the low power memory 8 may comprise more than one type of memory technology.

The processor has virtual memory management hardware, such as a translation lookaside buffer (TLB) 18. A controller 20 is also provided for managing the storage of data within the cache 5 and the memory 8. The controller includes a power control mechanism 22 for controlling the power supply unit 15 to selectively place individual cache segments 12 of the DRAM cache 5 in one of a normal state in which data may be stored by the cache segment, and a power saving state in which the power consumption is reduced compared to the normal state. The power control mechanism 22 is configured to control the power supply unit 15 to selectively power down any segments that are not required for storing cached data. When more data needs to be stored in the cache 5, then segments can be brought out of the power saving state and placed in the normal state.

The controller also includes a cache allocation mechanism 25 for controlling the allocation of data to the cache 5. The low power memory 8 consumes much less power per amount of stored data than the DRAM cache 5. However, the time required to access data from the memory 8 is much greater than the time for accessing data from the cache 5. Therefore, if the access latency of the memory is greater than the interval between successive accesses to a piece of data then it will be more efficient to store that piece of data in the cache 5 than in the memory 8. The cache allocation mechanism 25 therefore selects data for allocation to the cache 5 in dependence upon the frequency at which data is accessed by the processor 2. To implement this, the processor may be provided with an access monitoring mechanism 30 for monitoring the interval between successive accesses to a piece of data stored in the cache 5 or the memory 8. The access monitoring mechanism 30 may be implemented as hardware or software. The cache allocation mechanism 25 selects data for allocation to the cache in dependence upon the inter-access interval monitored by the access monitoring mechanism 30. When data is to be allocated to the cache 5, the cache allocation mechanism 25 selects a cache location for storing the newly cached data. The cache allocation mechanism 25 selects cache locations from already powered cache segments 12 in preference to cache locations from cache segments 12 that are in the power saving mode. Within a cache segment 12 that is in the powered on state, the cache allocation mechanism 25 selects a cache location for storing the newly cached data with the following order of preference: an invalid cache location, a clean cache location storing evictable cached data, and a dirty cache location storing evictable cached data. If no such cache locations are available in a powered cache segment 12, then the power control mechanism 22 controls the power supply unit 15 to bring one or more cache segments 12 out of the power saving mode and supply these segments with full power so that they can store some of the allocated data. The operation of the cache allocation mechanism will be described in more detail below with reference to FIGS. 5 and 6.

Once data has been allocated to the cache 5, the data may be accessed more rapidly by the processor 2. However, maintaining that data in the cache 5 consumes more power than would be the case if the data was stored only in the memory 8. Therefore, the system has mechanisms for monitoring whether it is still necessary for data to be cached in the cache 5, or whether it may be evicted and stored only in memory 8. An eviction selection mechanism 35 is provided to select cached data for eviction. The eviction selection mechanism 35 has several techniques for selecting data for eviction. In one technique, the eviction selection mechanism 35 is responsive to a cache access interval monitored by the access monitoring mechanism 30 to select data for eviction. This technique for selection of data to be evicted will be described below with reference to FIG. 4. The eviction selection mechanism 35 could also select data for eviction in dependence upon an interval since the last access to cached data (this interval can be monitored by the access monitoring mechanism 30). Data that has not been accessed for an interval that is greater than a threshold time could be selected for eviction, so as to remove data that is not longer being used by the processor 2 from the cache 5. Another way in which data can be selected for eviction by the eviction selection mechanism 35 is that the processor 2 could provide the eviction selection mechanism 35 with a signal 37 indicating that one or more pieces of data within the cache will no longer be needed by the processor 2. The eviction selection mechanism 35 can be responsive to the signal 37 to select this data for eviction. A similar signal could be used by the processor 2 to signal to the controller 20 that cached data should never be evicted to memory 8.

When data is selected for eviction by the eviction selection mechanism 35, then this data is marked as evictable (or reclaimable) by the controller 20. However, when selected the evictable data is not evicted from the cache right away. This is because a separate cache compaction mechanism 40, independent from the eviction selection mechanism 35, is provided for controlling compaction of the DRAM cache 5. The cache compaction mechanism 40 acts to evict evictable data from the cache 5 and to rearrange the cached data within the cache 5 so that the non-evictable data is packed into fewer segments 12 than had been used prior to eviction. Following cache compaction by the cache compaction mechanism 40, one or more segments 12 of the cache 5 will no longer be required for storing cache data, and so these segments may be placed in the power saving state by the power supply unit 15 under control of the power controller 22. By selecting data for eviction in dependence upon the data currently being used by the processor 2, and performing cache compaction periodically so as to evict data selected as being evictable and consolidating the cached data into fewer cache segments 12, the number of active cache segments can be varied dynamically in dependence upon the requirements of the processor 2 so as to conserve power where possible without affecting the performance of the system.

Figure 2:
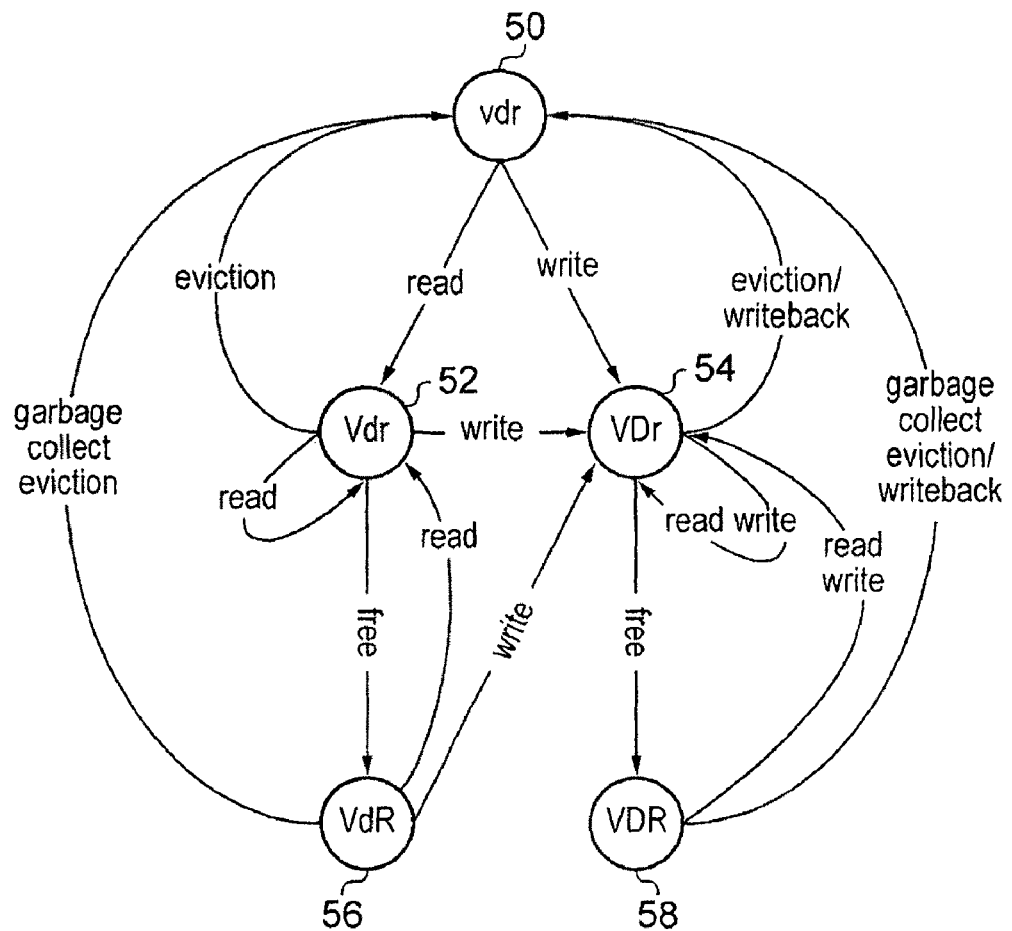
FIG. 2 shows a state diagram indicating changes in the state of a cache memory location.

The controller 20 can monitor the current status of different cache locations within the DRAM cache 5. One way in which the controller 20 can do this is by maintaining state information indicating the state of each cache location. FIG. 2 illustrates a state diagram indicating changes of state for a location with the cache 5. In this example, the controller 20 maintains three bits for each location: a valid bit V indicating whether or not the location is currently being used to cache data from the memory 8, a dirty bit D indicating whether or not the cached data has been changed by the processor 2 without changing the corresponding data in the memory 8, and a reclaimable bit R indicating whether or not the data at that location has been selected for eviction by the eviction selection mechanism 35. In FIG. 2, nodes 50-58 represent possible combinations of state bits for a particular cache location. In each state, an upper case letter indicates that the state bit has been set, while a lower case indicates that the state bit has not been set.

When a cache location is not currently being used to cache data, then it is invalid and so is in state 50 of FIG. 2. In this state, the valid, dirty and reclaimable bits are all not set. Once data is allocated to the cache location then that location becomes valid and so the state of that location moves to state 52 where the valid bit is set. Subsequent reading of the data from that location by the processor 2 does not change the state because the value of the data does not change. However, if the processor 2 writes to the cache location then the state of the location changes to state 54 where the dirty bit becomes set. If while in states 52 or 54 the data within the cache location is selected for eviction by the eviction selection mechanism 35 then the reclaimable bit R is set and so the state of the location moves to state 56 or 58 as shown in FIG. 2. While in the reclaimable state, the cached data remains accessible to the processor 2. It is only when the cache compaction mechanism 40 performs a cache compaction (or garbage collection) process that the reclaimable data is evicted from the cache. When data is evicted, if the dirty bit D has been set then the data will also be written back to memory 8. When data is evicted from a cache location then that cache location becomes invalid again and all state bits are cleared, returning to state 50. Note that if evictable data in states 56 or 58 is accessed by the processor 2, then that data may be unselected by clearing the reclaimable bit, thus reverting to non-evictable states 52 or 54.

Figure 3:
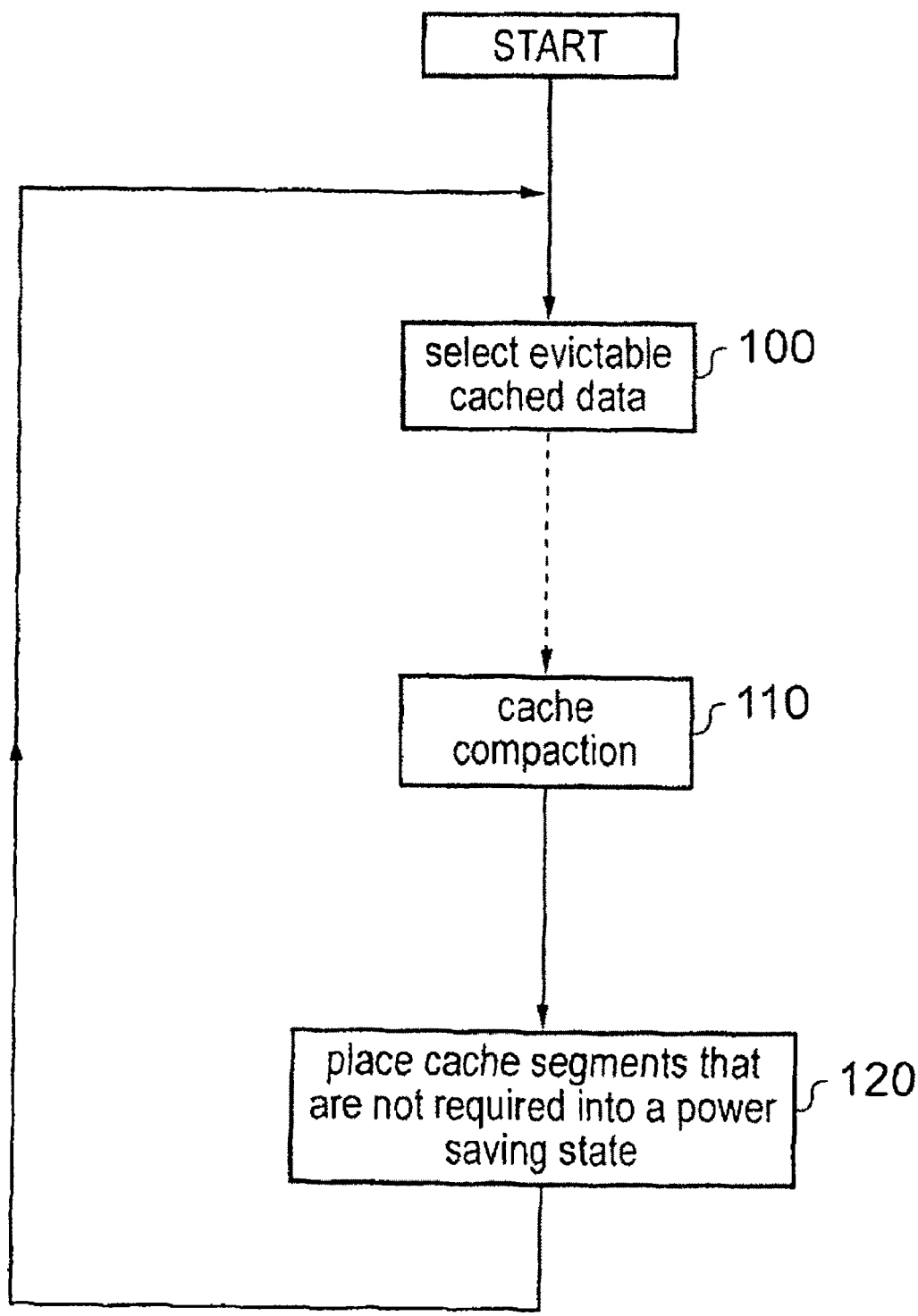
FIG. 3 shows a flow diagram illustrating a method of cache management according to one example of the present technique.

FIG. 3 shows a flow diagram illustrating a cache maintenance method according to one example of the present technique. At step 100, the eviction selection mechanism 35 selects data stored in one or more cache locations as evictable cached data. The evictable cached data may not all be selected at once, as the eviction selection mechanism 35 may select data in different ways, for example in dependence upon cache or memory access intervals monitored by the access monitoring mechanism 30, or triggered by signal 37 provided from the processor 2. Independent from the selection of evictable cache data, but at some time later, the cache compaction mechanism 40 performs cache compaction in step 110 of FIG. 3. Steps 100 and 110 are linked by a dotted line in FIG. 3, indicating that although the cache compaction step 110 follows the selection of evictable cache data at step 100, the cache compaction 110 is independent of the selection of evictable cache data 100 and so does not necessarily follow immediately after the selection of evictable cache data. In the cache compaction step 110, the cache compaction mechanism 40 evicts evictable cached data from the cache 5 and stores non-evictable cached data (i.e. data from locations where the reclaimable bit is not set) into fewer cache segments than were being used to store the cache data prior to the eviction of the evictable cached data. The flow then proceeds to step 120 where the power control mechanism 22 controls the power supply unit 15 to place into a power saving state at least one cache segment that is not required to store any cache data, following eviction of the evictable cached data. While it is possible that only a subset of the cache segments 12 that are no longer required are placed in the power saving state, a greater power saving will be achieved if all cache segments that no longer are needed are powered down. As cache maintenance is an ongoing process that is continuously carried out by the mechanisms of the controller 20, then after step 120 flow returns to step 100 where further cached data is selected for eviction.

An example of the operation of the eviction selection mechanism 35 in conjunction with the access monitoring mechanism 30 will now be explained in further detail with reference to the flow chart shown in FIG. 4. The access monitoring mechanism 30 monitors the interval between successive accesses to cached data within the cache 5. If the inter-access interval becomes greater than the access latency of the low power memory 8 (whether that is a read latency or a write latency), then it is no longer power-efficient to maintain that data within the cache 5. Since in this case the lower power memory 8 can satisfy the demand for that piece of data, a power saving can be achieved (without unduly affecting system performance) by storing the data in the memory 8 and evicting the data from the cache 5. However, since the cache access interval may vary somewhat while data is repeatedly accessed by the processor 2, it is not desirable to select data for eviction as soon as the cache access interval becomes greater than the access latency of the memory 8. Instead, the eviction selection mechanism 35 is configured to select data which is consistently being accessed at intervals greater than the access latency of the memory 8 for eviction from the cache 5. The method shown in FIG. 4 achieves this.

First, at step 150 the eviction selection mechanism 35 determines whether there is an access to cached data. The eviction selection mechanism 35 waits until there is an access before proceeding to step 155, at which it is determined whether cache access interval, that is the interval between the current access and the most recent access to the same data, is greater than a cache access interval threshold. To ensure that the cache 5 and memory 8 are used efficiently, it is useful to set the cache access interval threshold to have a minimum value of the read or write latency of the memory 8. If at step 155 it is determined that the cache access interval is not greater than the cache access interval threshold, then flow returns to step 150 where the eviction selection mechanism 35 again waits for another cache access. If, however, at step 155 the cache access interval is greater than the cache access interval threshold, then at step 160 a confidence counter is incremented by the eviction selection mechanism 35. The confidence counter indicates the number of times that the accessed data has been accessed at an interval greater than the cache access interval threshold, and so is a measure of how confident the eviction selection mechanism 35 is that the accessed data can be evicted from the cache 5. Next, flow proceeds to step 165, where it is determined whether or not the confidence counter is greater than a confidence threshold value. If the confidence counter is not greater than the confidence threshold, then flow returns to step 150 where the eviction selection mechanism waits for another cache access. However, if at step 165 the confidence counter is greater than the confidence threshold, then at step 170 the access data is selected as evictable. This can be done, for example, by setting the reclaimable bit (as shown in FIG. 2). Flow now proceeds back to step 150 where the mechanism again waits for another access to cached data. Note that when data is selected for eviction by the eviction selection mechanism 35, that data continues to be accessible to the processor 2 as it is not actually evicted from the cache 5 until cache compaction is performed.

Figure 4:
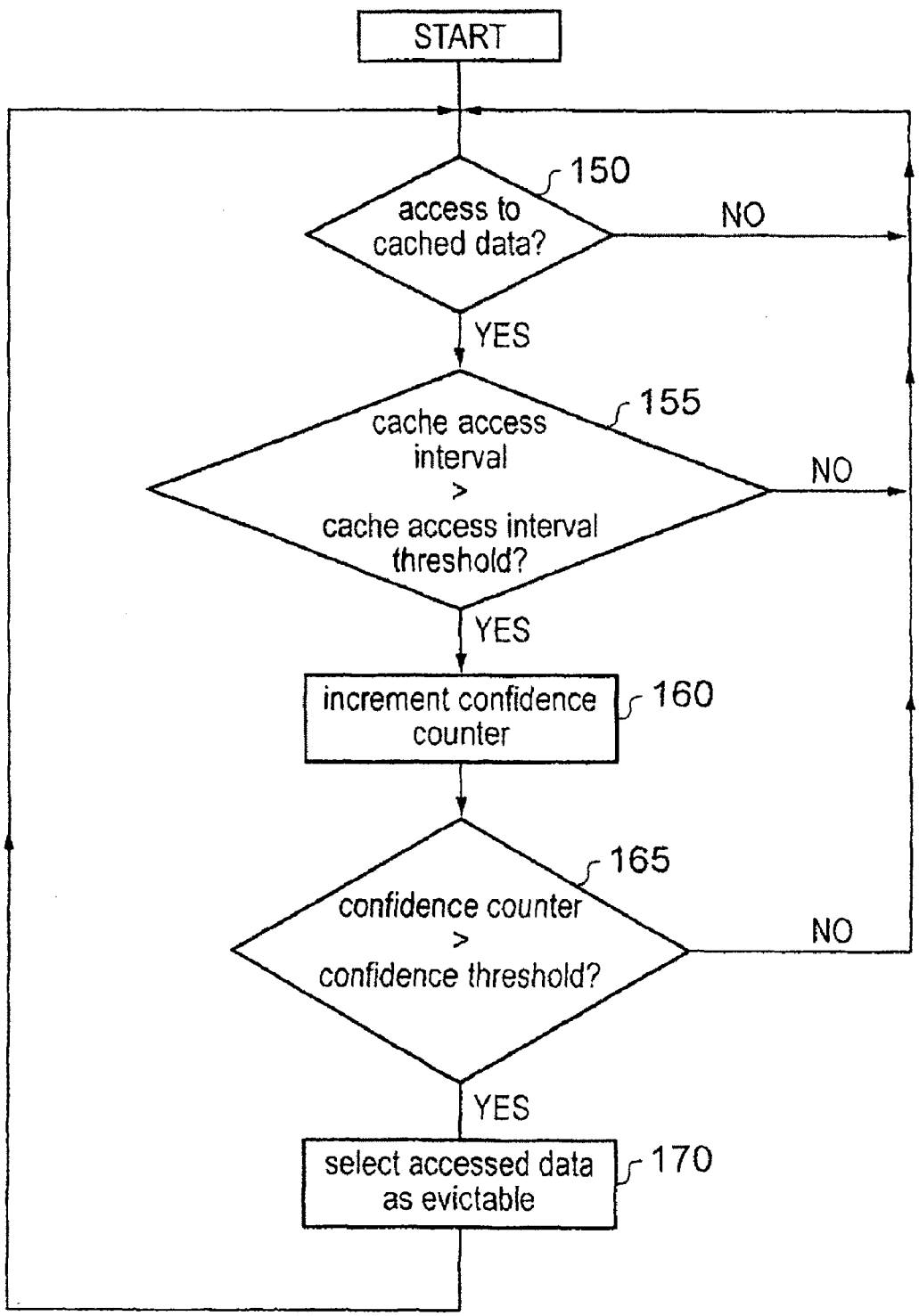
FIG. 4 shows a flow diagram illustrating an eviction selection algorithm according to one example of the present technique.

As well as, or instead of, the mechanism showing FIG. 4, the eviction selection mechanism 35 can also select data for eviction if the access monitoring mechanism 30 determines that an interval since the data was last accessed by the processor 2 has become greater than a predetermined threshold. Also, the eviction selection mechanism 35 can be responsive to the data not used signal 37 provided by the processor 2 to select evictable data. Thus, the eviction selection mechanism 35 identifies candidate data for eviction.

Figure 5:
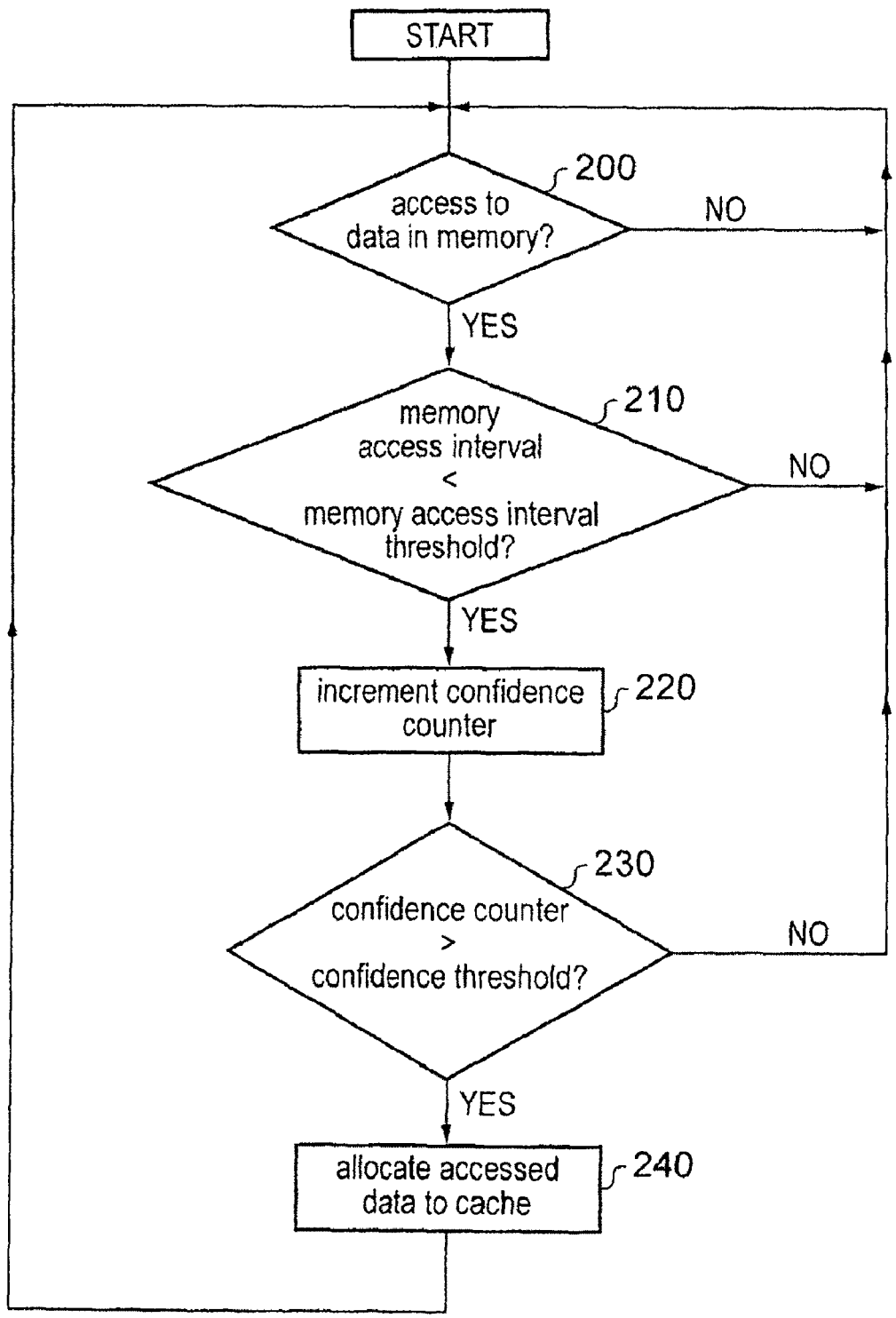
FIG. 5 shows a flow diagram illustrating a cache allocation mechanism according to one example of the present technique.

The method shown in FIG. 4 selects data for eviction based on whether or not the access intervals for that data have been consistently greater than an access interval threshold, which will typically be set to be an access latency of the memory 8. A similar principle can be used to implement an algorithm for allocating data to the cache, as shown in FIG. 5. FIG. 5 shows a flow chart illustrating a method of cache allocation performed by the cache allocation mechanism 25. Just as data is evicted from the cache once the cache access interval becomes repeatedly greater than a cache access interval threshold, the cache allocation mechanism 25 selects data for allocation to the cache once a memory access interval becomes repeatedly less than a memory access interval threshold. This threshold would typically be set to be the access latency of the memory or greater. Note that the higher the threshold value, the more likely it is that data will be allocated to the cache, so for systems where quick processing times are crucial then a higher threshold value should be selected than for systems where low power consumption is the most important criterion.

The cache allocation method shown in FIG. 5 operates each time data is accessed from memory 8. At step 200 it is determined whether a memory access has occurred. When a memory access occurs, then it is determined at step 210 whether or not the memory access interval (that is, the interval between the current memory access and the previous memory access) is less than a memory access interval threshold. If this is not the case, then flow returns to step 200. If the inter-access interval is less than the memory access interval threshold then flow proceeds to step 220 where a confidence counter is incremented. At step 230 it is determined whether the confidence counter is greater than the confidence threshold, and if this is the case, then at step 240 the access data is allocated to the cache. When data is allocated to the cache 5, then the controller 20 will need to select a location within the cache to which the data can be allocated. Various cache allocation algorithms are possible. In one example algorithm, then most preferably an invalid cache location which is not currently being used to cache data would be used to store the allocated data (if required, then an additional cache segment 12 can be powered up by the power supply unit 15 so as to provide more cache space). If no invalid locations exist, then a location containing evictable data would be selected for allocation, for example using a least recently used (LRU) method. If no invalid or evictable locations exist, then a valid, non-evictable location would be replaced using a LRU algorithm. For a main memory having a higher write than read latency, a modified algorithm such as a clean first least recently used (CFLRU) could be used for better performance. In CFLRU a clean cache location is selected in preference to a dirty cache location, because no writeback to memory will be required when clean data is evicted from the cache. Another algorithm for selecting a victim cache location is discussed below with reference to FIG. 6. Once data has been allocated to the cache at step 240 then flow returns to step 200 where it is again determined whether a memory access has occurred.

Note that in FIGS. 4 and 5 both the eviction selection mechanism 35 and the cache allocation mechanism 25 maintain a confidence counter. The confidence counter for the eviction selection method in FIG. 4 counts the number of cache accesses that are infrequent enough to be satisfied by the main memory. The confidence counter for the cache allocation mechanism in FIG. 5 counts the number of accesses to a non-cached piece of data that are too frequent to be satisfied by the main memory. Thus, the values of the confidence thresholds for the respective mechanisms will determine how soon data will be evicted from the cache or allocated to the cache. Performance slowdown can be reduced by setting the confidence threshold for the eviction selection mechanism 35 to a high value and the confidence threshold for the cache allocation mechanism 25 to a low value. On the other hand, if performance slowdown is not as important an issue then greater power savings can be achieved by reducing the confidence threshold for the eviction selection mechanism 35 and increasing the confidence threshold for the cache allocation mechanism 25, so that data is retained in the memory for longer before being cached.

Figure 6:
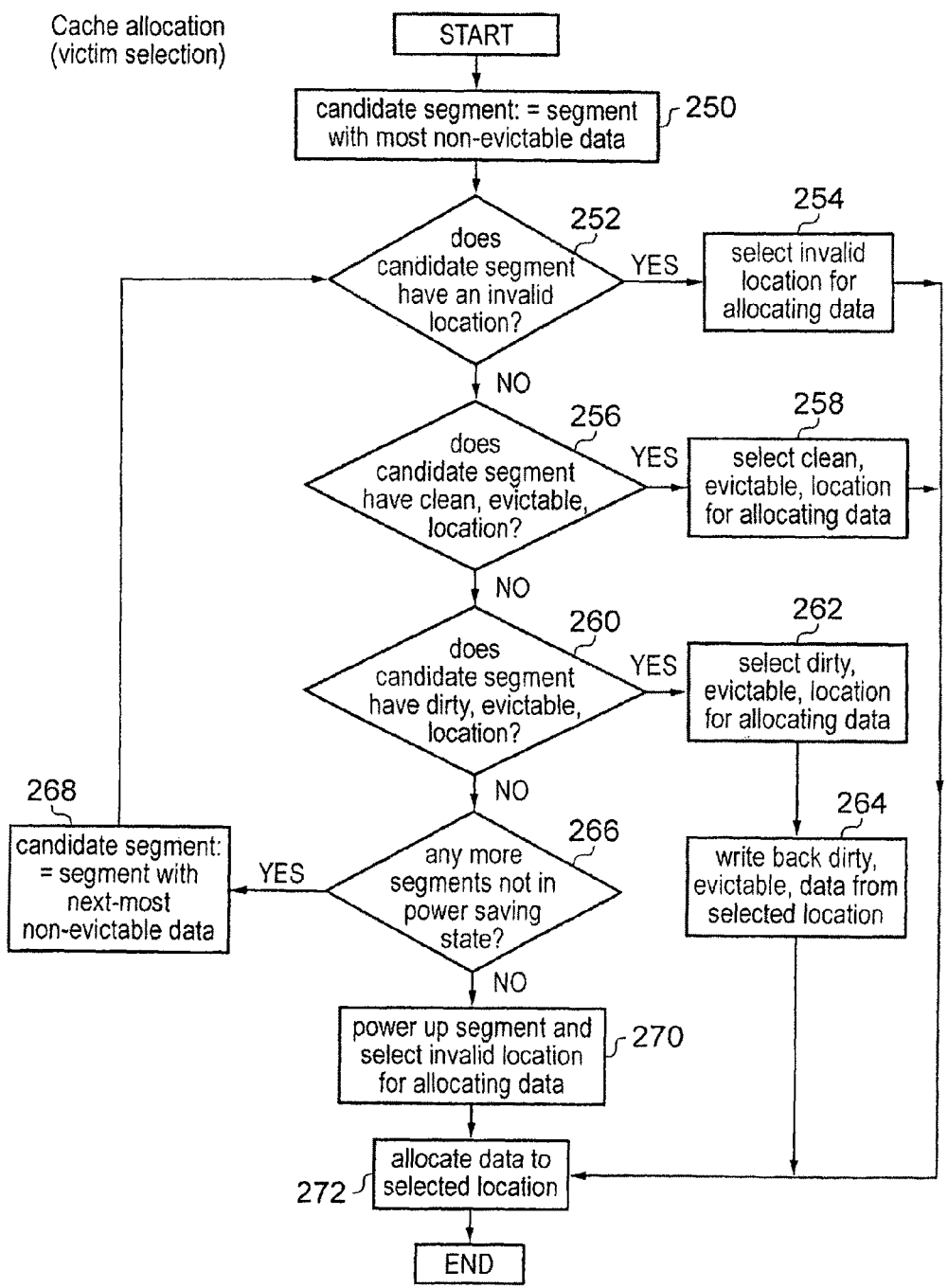
FIG. 6 shows a flow diagram illustrating a method for selecting a cache location for allocating newly cached data.

FIG. 6 shows an example of a process performed by the cache allocation mechanism 25 when allocating new cached data to the cache 5. When data is to be allocated to the cache 5, for example following a cache miss, the cache allocation mechanism selects a cache location (known as a victim cache location) to which the newly cached data is allocated. FIG. 6 shows an example of how the victim cache location is selected.

First, in step 250, the cache allocation mechanism 25 sets as a candidate cache segment the cache segment 12 having the most locations storing non-evictable data. At step 252, it is determined whether the candidate cache segment contains at least one invalid cache location. If there is an invalid cache location in the candidate segment, then at step 254 one of the invalid cache locations is selected as the victim location. If the candidate cache segment does not have an invalid cache segment, then at step 256 the cache allocation mechanism 25 identifies whether the candidate cache segment has any cache locations storing clean, evictable, cached data. If this is the case, then at step 258, the cache allocation mechanism selects one of the clean evictable cache locations for storing the new cached data. The selected one of the clean evictable cache locations could be the location which has been least recently accessed, or could be selected at random. Alternatively, if at step 256 it is determined that the candidate cache segment does not have any clean evictable cache locations, then at step 260, it is determined whether the candidate cache segment has any dirty, evictable cache locations. If at least one dirty evictable cache location exists, then at step 262 one of these locations is selected as the victim location, and at step 264 the dirty data is written back to memory 5 from the dirty, evictable, cache location. As for the selection of a clean location at step 258, the selected dirty evictable cache location can be selected in step 262 in accordance with a least recently used (LRU) algorithm, or can be selected at random.

If at step 260 the cache allocation mechanism 25 finds that the candidate cache segment has no dirty evictable cache locations, then at step 266 it is determined whether there are any more cache segments that are not in the power saving state. If this is the case, then at step 268 the cache segment 12 having the next most non-evictable data (after the currently selected candidate cache segment) is set as the candidate cache segment, and then steps 252-266 are repeated for the newly selected candidate cache segment. If at step 266 it is determined that there are no more currently activated cache segments, then at step 270 a cache segment 12 that is currently in the power saving state is powered up by the power control circuitry 22 and power supply 15, and an invalid location from the newly powered up cache segment is selected as the victim location.

Finally, following selection of a victim cache location for storing the newly allocated cache data in one of steps 254, 258, 262 and 270, the newly cached data is stored in the selected cache location in step 272. The cache allocation process then ends. Since the cache allocation mechanism 25 is arranged to select cache locations from powered up cache segments in preference to cache segments in the power saving mode, and selects cache locations from the cache segment 12 having the most non-evictable data in preference to cache segments 12 having fewer locations storing non-evictable data, newly allocated data is allocated to more densely packed segments and so over time the cache will become more compact, thus allowing more cache segments to be powered down.

Figure 7:
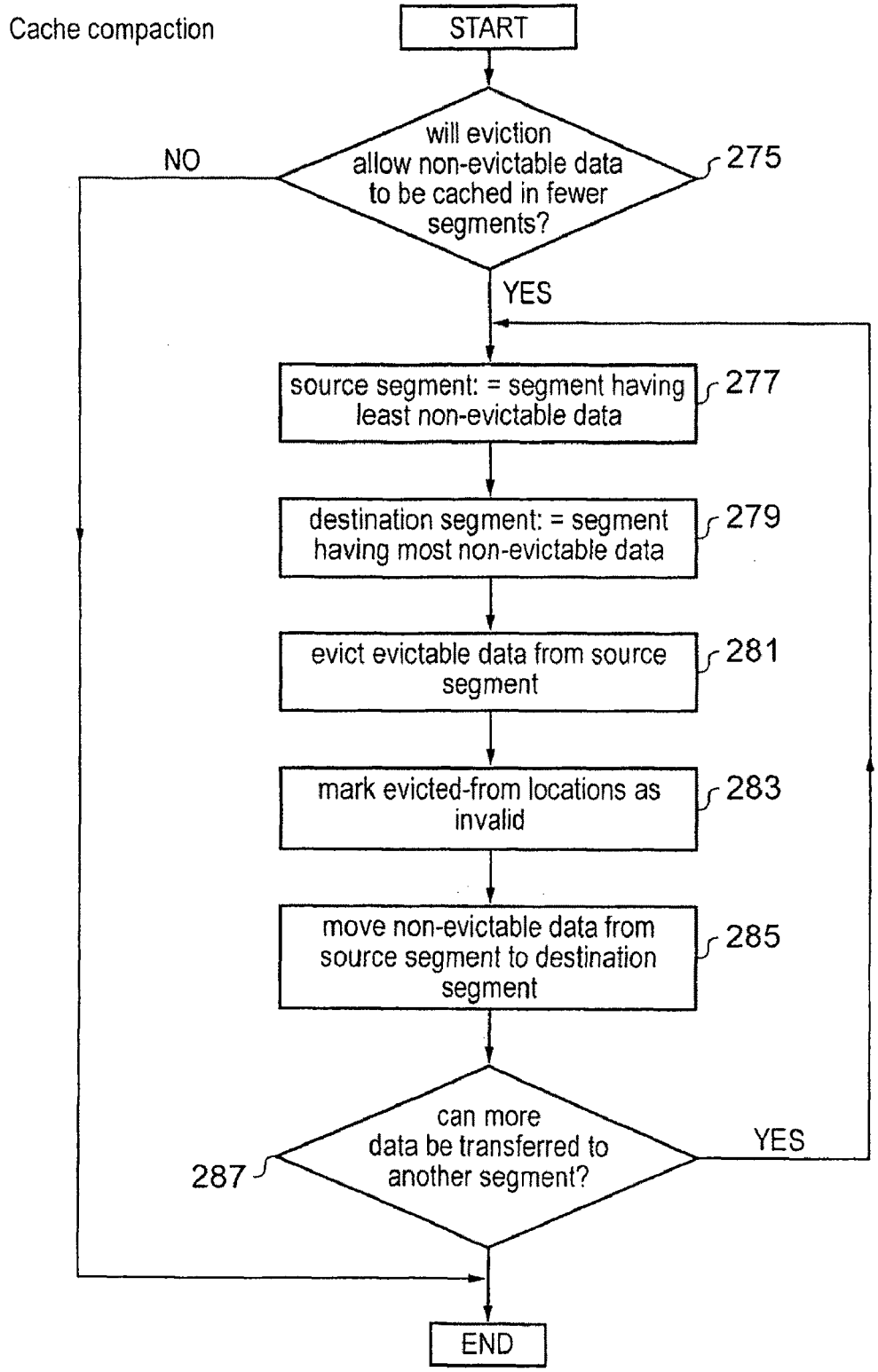
FIG. 7 illustrates a cache compaction algorithm according to one example of the present technique.

Having selected one or more pieces of data for eviction from the cache, power savings are achieved by performing periodic cache compaction using the cache compaction mechanism 40. Cache compaction enables the number of active cache segments 12 to be varied dynamically in dependence upon the current usage of cached data by the processor 2. A method of cache compaction is shown in FIG. 7. First, at step 275, the cache compaction mechanism 40 determines whether eviction of evictable cached data would enable the remaining non-evictable cached data to be cached in fewer cache segments than are currently being used to store the cached data. This may be done by determining whether, for any candidate cache segment, the total number of invalid and evictable cache locations in currently powered segments other than the candidate cache segment is equal or greater than the number of non-evictable locations in the candidate cache segment. If eviction of evictable cached data would not allow fewer segments to be used then there is no point in performing cache compaction as cache compaction will not result in any power savings, and so it is better to retain the evictable cached data in the cache where it can be accessed more rapidly by the processor 2. Therefore, if the cache compaction mechanism 40 determines at step 275 that eviction will not allow fewer segments to be used then the process of FIG. 7 ends. The cache compaction mechanism would then wait until the next time it initiates cache compaction, by which time more data may have been selected for eviction.

If at step 275 it is determined that eviction would enable fewer cache segments 12 to be used, then flow proceeds to step 277 where the cache compaction mechanism 40 determines which cache segment 12 contains the fewest valid locations that are currently storing non-evictable cached data. The segment having the least non-evictable data is referred to below as a source segment. Next, at step 279, the segment having the most valid locations storing non-evictable data is identified. This segment is referred to below as a destination segment. At step 281 the cache compaction mechanism evicts evictable cached data from the source cache segment. If any of this evictable data is dirty (that is, it has been modified by the processor 2 without being written back to the memory 8) then the evicted data is written back to the memory 8. The locations from which data is evicted within the source segment are then marked as invalid at step 283. Flow then proceeds to step 285, where the cache compaction mechanism 40 migrates non-evictable data from the source cache segment to one or more cache locations of the destination cache segment. The cache locations of the destination cache segment to which the cached data is migrated are invalid cache locations or cache locations storing evictable cached data. Clean evictable cache locations are selected in preference to dirty evictable cache locations, and if a dirty location is selected the dirty evictable data is written back to memory before transferring the data from the source cache location. If possible, all of the non-evictable cached data from the source segment is transferred to the destination segment, although if there are fewer invalid or evictable cache locations in the destination segment than there are locations storing non-evictable cached data in the source segment then only a portion of the non-evictable cached data is transferred. At step 287, the cache compaction mechanism 40 determines whether any more data can be transferred from a segment having less non-evictable data to a segment having more non-evictable data. If more data can be transferred, then flow returns to step 277 and steps 277 to 285 are repeated so as to further compact the cache. If no more data can be transferred, then the cache is as compact as possible and so flow ends.

By performing the method according to FIG. 7, the non-evictable data within the cache 5 can be moved within the cache so that it occupies fewer cache segments 12. This means that at least one cache segment is no longer required to store cached data and so may be placed in the power saving mode by the power supply unit 15 under control of the power control mechanism 22 (see step 120 of FIG. 3). Thus, for most of the time, when little cached data is needed, then only a small amount of the cache needs to be fully powered and so power consumption is reduced. However, on the few occasions when a lot of cached data is necessary, then an increased amount of cache capacity is available so as to provide quick access to the data. By providing a cache compaction mechanism for dynamically adjusting the effective cache size, power consumption can be significantly reduced while maintaining system performance.

The processor 2 may generate data while carrying out processing operations. In this case, performance can be improved by allocating the generated data to the cache initially. Since it is likely that the processor 2 may access the recently generated data again, a warm-up performance hit can be avoided by placing the data in the cache 8 initially rather than storing the data only in the memory 5. If it turns out that this data is used infrequently by the processor 2 then it can be evicted to the memory later by the cache compaction mechanism 40. Bit information in the page table entry for the page allocated to cache but not memory can record this fact and indicate that when the data is evicted from the cache it should be written back to memory.

The allocation and compaction mechanisms may be modified to pack data more sparsely into more cache segments. For example, data could be randomly allocated to several cache segments rather than the segment having the most non-reclaimable data. This can improve system performance via increased bank interleaving.

The controlling mechanisms 22, 25, 30, 35, 40 described above can be implemented in various different ways. In FIG. 1, for example, the power control mechanism 22, the cache allocation mechanism 25, the eviction selection mechanism 35 and the cache compaction mechanism 40 have all been illustrated as part of the controller 20, and the access monitoring mechanism 30 has been illustrated as part of the processor 2. However, it will be appreciated that these mechanisms may be implemented differently. For example, each mechanism 22, 25, 30, 35, 40 could be implemented as part of a memory management processor for managing page caching decisions, possibly having its own local memory. Also, each mechanism could be implemented using a dedicated cache compaction unit for managing the cache compaction. This hardware unit could be provided with a full or compressed table of memory statistics, recording the times between memory accesses and the confidence counters for the cache allocation and eviction selection mechanisms. The controlling mechanisms could also be implemented using software algorithms executed by the processor 2 or a separate management processor (not illustrated in FIG. 1). These software-based algorithms would record memory accesses and measure the inter-access time interval. A combination of these options is also possible, in which different mechanisms are implemented in different ways.

Figure 8:
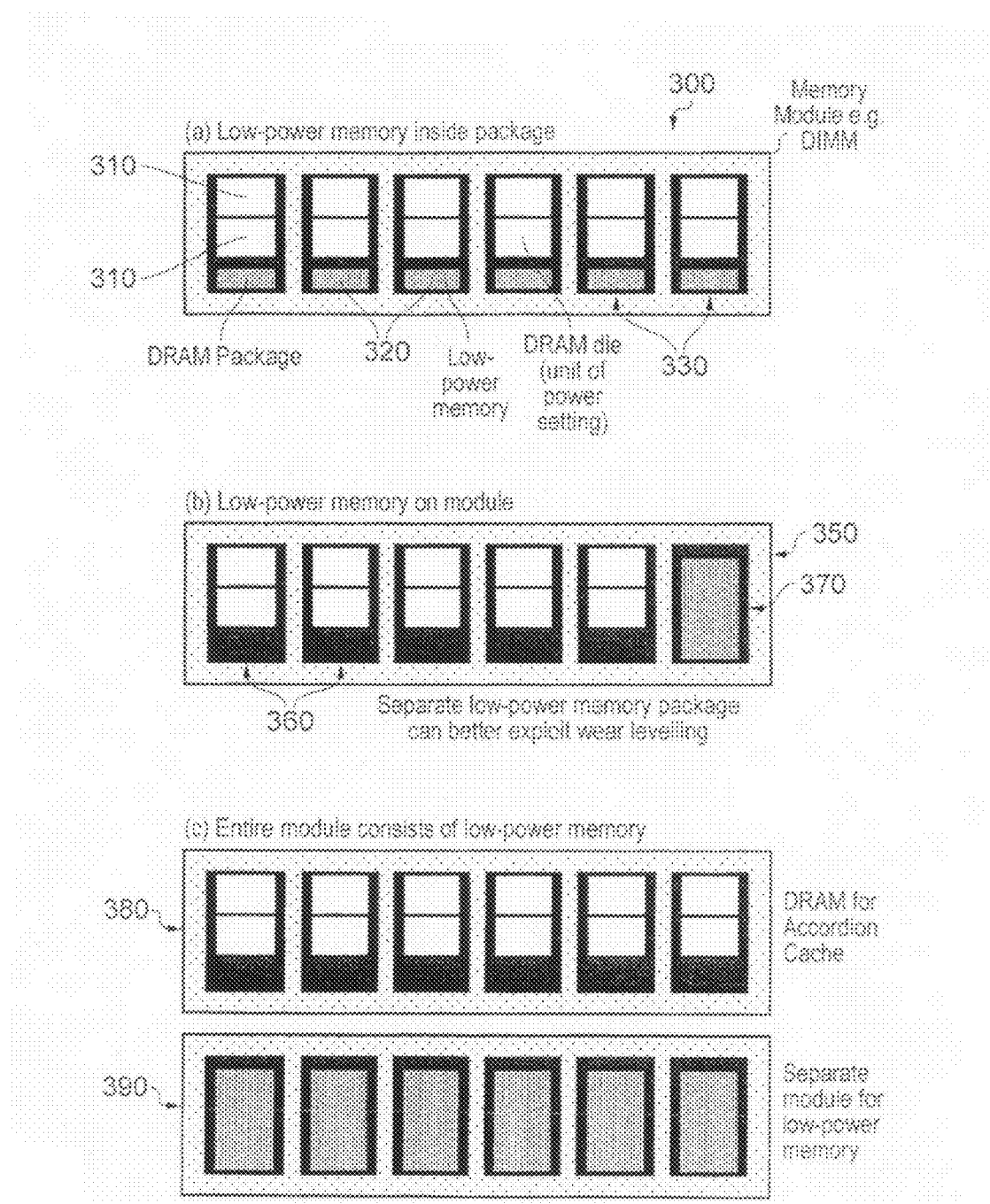
FIGS. 8(a), 8(b) and 8(c) illustrate example configurations of the cache memory and main memory according to examples of the present technique.

In FIG. 1, the cache 5 and the low power memory 8 have been illustrated using separate blocks so as to illustrate their separate functions. However, it will be appreciated that in practice the cache 5 and memory 8 do not need to be implemented on separate memory modules. FIGS. 8(*a*), 8(*b*) and 8(*c*) show some of the arrangements of the cache memory 5 and the low power memory 8 that are possible.

FIG. 8(*a*) shows a hybrid memory module 300 having both DRAM cache locations 310 and low power memory locations 320. Note that most of the circuit area is provided for DRAM, not the more densely packed low power memory, in order to provide sufficient cache capacity to achieve quick access to a large amount of data when this is needed by the processor 2. Energy can be conserved by powering down segments of the cache when they are not required. The hybrid memory module 300 has the advantage that when data is written back to memory or allocated to the cache, data can be transferred within the memory module 300 and so access to the system bus 10 is not always required. This helps to reduce bus traffic, freeing up more bandwidth for use by the processor 2.

In FIG. 8(*a*) the memory locations 320 and the cache locations 310 are arranged in blocks 330, each block having some memory locations 320 and some cache locations 310. However, as illustrated in FIG. 8(*b*) it is also possible for a hybrid memory module 350 to comprise a number of dedicated cache memory blocks 360 having only cache memory locations, and a dedicated memory block 370 having only memory locations. This can be advantageous in embodiments where the low power memory consists of flash memory, because having a concentrated, larger block of memory locations 370 can better exploit wear levelling than the same number of memory locations distributed among several blocks as shown in FIG. 8(*a*).

It is also possible for the cache and memory to be implemented on separate memory modules, as shown in FIG. 8(*c*). In this case, a cache memory module 380 and a memory module 390 would be provided, each of which can be inserted into different memory sockets of the data processing system 1.

Figure 9:
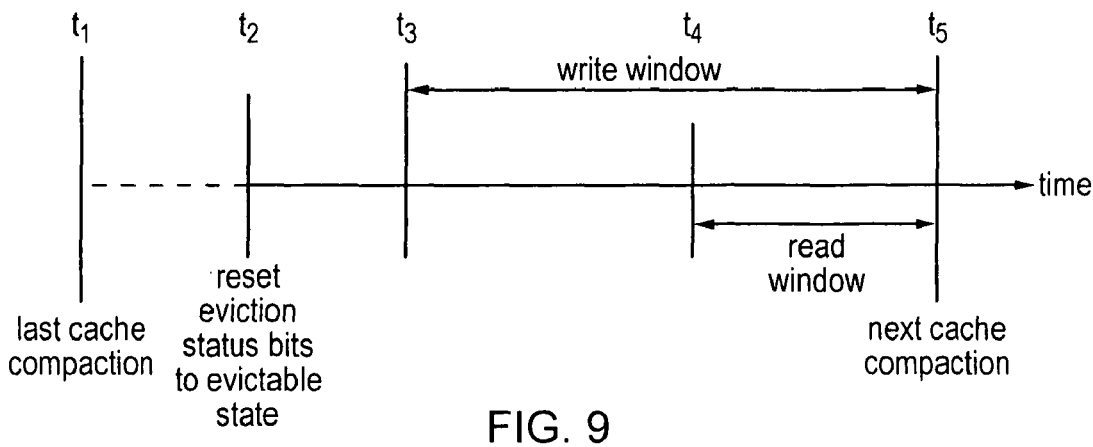
FIG. 9 shows a technique for selecting data for eviction.
Figure 10:
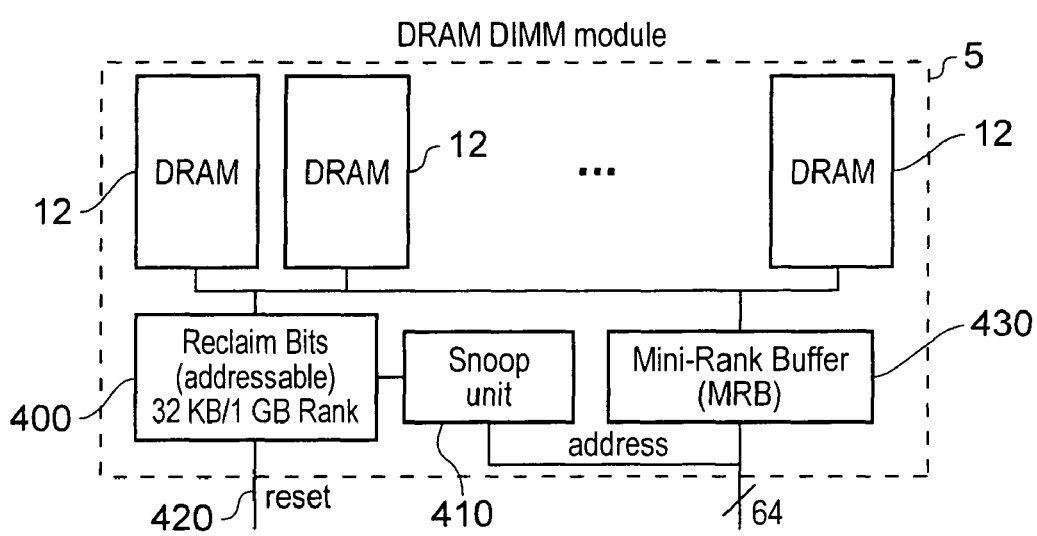
FIG. 10 schematically illustrates a cache memory module adapted to store eviction status bits indicating the eviction status of cache locations.
Figure 11:
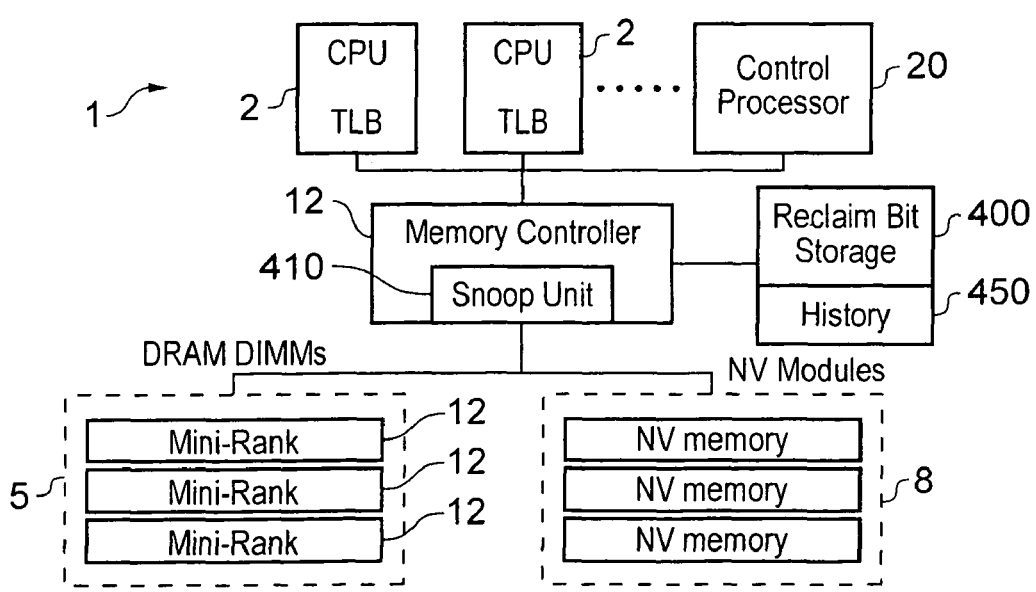
FIG. 11 depicts an arrangement in which eviction status bit storage and an access monitoring mechanism are provided separately from the cache memory module.

FIGS. 9 to 11 show another example of a way in which cached data can be selected for eviction by the processing apparatus 1. As described above, it is possible to monitor inter-access intervals in order to determine which data should be evicted. However, this may require a significant amount of storage capacity and processing resource in order to store time stamps or counters for recording the intervals elapsed between accesses to each cache location. FIG. 9 shows a technique for selecting evictable cached data in which less overhead is used.

In the technique of FIG. 9, a set of eviction status bits are maintained (either within the cache memory module or coupled to the cache controller 20—see FIGS. 10 and 11). Each eviction status bit corresponds to a respective cache location in the cache 5, and may be set to one of two states: an evictable state indicating that the corresponding cache location contains evictable cached data, and a non-evictable state indicating that the corresponding cache location contains non-evictable cached data. For example, when an eviction status bit is set to 1 then this could indicate non-evictable data, while when it is set to 0 this could indicate evictable data. Below, we shall assume that this mapping of eviction status bit values is being used (although it will be appreciated that alternatively a bit value of 1 could indicate evictable data and 0 could indicate non-evictable data).

FIG. 9 shows an example of how the eviction status bits (also known as reclaim bits) may be processed during the interval between two successive cache compaction events performed by the cache compacting mechanism 40. At time $t_1$ one compaction event is carried out. Following the cache compaction, at time $t_2$ all eviction status bits are reset to the evictable state. For example, this can be achieved by writing zeros to the eviction status bits or by not refreshing the bit cells storing the status bits. Some time prior to the next compaction event a write window begins at $t_3$. The write window continues up to the occurrence of the next cache compaction at time $t_5$. During the write window, a write to a cache location causes the corresponding eviction status bit to be set to the non-evictable state. Similarly, at a time $t_4$ a read window begins, which continues up to the time of the cache compaction at time $t_5$. During the read window, a read to a cache location causes the corresponding eviction status bit to be set to the non-evictable state. Although in FIG. 9 the write window has been indicated as being longer than the read window, this does not necessarily have to be the case. When the next cache compaction event occurs at time $t_5$, any cache locations for which the corresponding eviction status bit is still set to the evictable state are selected as containing evictable cached data, and so data from these locations may be evicted during compaction performed by the cache compaction mechanism 40.

FIG. 10 shows an example of a cache memory module 5 which may be arranged to implement the technique shown in FIG. 9. The cache memory module 5 contains an eviction status bit storage (or reclaim bit storage) 400, and a snoop unit 410 for monitoring accesses to the locations in the cache segments 12 of the cache module 5 and controlling the state of the eviction status bits. In this arrangement, the eviction status bit storage 400 is implemented as a special cache segment that unlike the other segments 12 is not subject to power control and cache compaction. The eviction status bit storage 400 contains one bit for each location in the cache module 5. Since only one bit is stored per cache location, the eviction status bit storage 400 requires little storage overhead. Also, since only one bit needs to be changed per cache access, this technique of eviction selection has little processing overhead. When a cache location is accessed by the processor 2, the snoop unit 410 is responsive to the address being accessed to set the corresponding eviction status bit to the non-evictable state if the access is within the appropriate read or write window. The snoop unit 410 may include registers for storing information for defining the read and write window intervals. The eviction status bit storage 400 may also be responsive to an external reset signal 420 provided by the processor 2 in order to reset all the eviction status bits to the evictable state. The reset signal 420 could be used, for example, if the cache needs to be flushed.

Since the reclaim bit storage 400 and the snoop unit 410 are provided as part of the cache memory module 5, the cache memory is easily expandable. New memory modules may be added and, since each module will already have the required amount of bit storage 400, no modification of the cache controller 20 would be necessary.

As shown in FIG. 10, the cache memory module 5 may comprise circuitry 430 for directing cache accesses to the appropriate cache segment 12. This circuitry 430 may be known as a "mini-rank buffer" (MRB). Zheng et al propose a way of implementing the mini-rank buffer.

FIG. 11 shows an alternative arrangement for providing the reclaim bit storage 400 and the snoop unit 410. The snoop unit 410 could be provided as part of the cache memory controller 20. The reclaim (eviction status) bit storage 400 could be provided separately from the memory modules and act as a global reclaim bit storage that is coupled to the cache controller 20. The reclaim bit storage 400 is addressable by the controller.

FIG. 11 also shows a variation in which the reclaim bit storage 400 includes an eviction status history store 450 for storing historical values of the eviction status bits. Periodically, a current set of values of the eviction status store 400 could be stored to the history store 450 (for example, the history could be recorded when a cache compaction event occurs). The history store 450 may be accessed by the various control mechanisms 22, 25, 35, 40. Storing various sets of history values enables the control mechanisms to determine inter-access intervals that are longer than the interval between two successive cache compaction events. This may be useful in order to identify data that should be evicted from the cache or allocated to the cache in order to improve the system performance and/or reduce the energy consumed by the memory system. Although FIG. 10 does not show the reclaim bit storage 400 having a history store 450 as in FIG. 11, it will be appreciated that the arrangement of FIG. 10 could also have a history store 450, and that the arrangement of FIG. 11 could be provided without a history store 450.

Some optional modifications that may be provided in the apparatus 1 are:
- The cache 5 and the memory 8 may be provided on separate memory buses so that the memory 8 can be arranged to operate at a lower frequency (and hence lower power) than the cache 5.
- A virtual to physical address mapping scheme similar to a hypervisor (as used in virtualization systems) may be used in the present technique. This allows simple modification of the physical location of data.
- A pre-fetching mechanism may be used to read data from memory 8 into the cache 5 in advance of the data being accessed, using address prediction techniques.
- Data transferred between the cache and main memory may be compressed using compression circuitry, in order to reduce the energy consumed by the bus and reduce the amount of data stored in memory (thus increasing memory lifetime).
- Individual cache locations within the cache 5 may be divided into smaller sub-blocks each associated with bits indicating whether the individual sub-blocks have been modified (i.e. are dirty). This means that on eviction only the sub-blocks that are dirty need to be written back to memory. This reduces the amount of bus traffic (and hence bus energy consumed) and increases memory lifetime, since less data needs to be written to memory. This is particularly advantageous for flash devices that have a limited number of erase cycles.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   data processing circuitry for processing data;
   a memory for storing data for use by said data processing circuitry;
   a cache memory comprising a plurality of cache segments and configured to store cached data from said memory;
   power supply circuitry for selectively supplying each of said cache segments with power;
   an eviction selection mechanism for selecting evictable cached data for eviction from said cache memory;
   a cache compacting mechanism configured to perform cache compaction by evicting said evictable cached data from said cache memory and storing non-evictable cached data in fewer cache segments than were used to store said cached data prior to eviction of said evictable cached data; and
   power control circuitry configured to control said power supply circuitry to place in a power saving state at least one of said cache segments that, following eviction of said evictable cached data by said cache compacting mechanism, are not required to store cached data.

2. A data processing apparatus according to claim 1, wherein said memory has a lower static power consumption per amount of stored data than said cache memory.

3. A data processing apparatus according to claim 1, wherein after evicting said evictable cached data from said cache memory said cache compacting mechanism is configured to move at least some non-evictable cached data to a different cache segment, such that fewer cache segments are required to store said non-evictable cached data than were required prior to eviction of said evictable cached data.

4. A data processing apparatus according to claim 1, wherein said at least one of said cache segments comprises all of said cache segments that, following eviction of said evictable cached data by said cache compacting mechanism, are not required to store cached data.

5. A data processing apparatus according to claim 1, further comprising an access monitoring mechanism for monitoring a cache access interval between successive accesses to cached data stored in said cache memory.

6. A data processing apparatus according to claim 5, wherein said eviction selection mechanism is configured, when cached data is accessed from said cache memory, to select said accessed cached data as said evictable cached data in dependence upon whether said cache access interval monitored by said access monitoring mechanism is greater than a cache access interval threshold.

7. A data processing apparatus according to claim 6, wherein said eviction selection mechanism is configured to:
   increment a confidence counter if said cache access interval is greater than said cache access interval threshold; and
   select said accessed cached data as said evictable cached data if said confidence counter is greater than a confidence threshold.

8. A data processing apparatus according to claim 6, wherein said cache access interval threshold is one of:
   at least a read latency of said memory; and
   at least a write latency of said memory.

9. A data processing apparatus according to claim 5, wherein said access monitoring mechanism is further configured to monitor a memory access interval between successive accesses to data stored in said memory; and
   said data processing apparatus further comprises a cache allocation mechanism configured, when data is accessed from said memory, to select said accessed data for allocation to said cache memory in dependence upon whether said memory access interval monitored by said access monitoring mechanism is less than a memory access interval threshold.

10. A data processing apparatus according to claim 9, wherein said cache allocation mechanism is configured to:
    increment a confidence counter if said memory access interval is less than said memory access interval threshold; and
    select said accessed data for allocation to said cache memory if said confidence counter is greater than a confidence threshold.

11. A data processing apparatus according to claim 9, wherein said memory access interval threshold is one of:
    at least a read latency of said memory; and
    at least a write latency of said memory.

12. A data processing apparatus according to claim 1, further comprising a cache allocation mechanism for allocating cached data to said cache memory; wherein:
    said cache allocation mechanism selects as a candidate cache location for storing said cached data a cache location from one of said cache segments that is not in said power saving state in preference to a cache location from one of said cache segments that is in said power saving state.

13. A data processing apparatus according to claim 12, wherein said cache allocation mechanism selects said candidate cache location by performing the following steps:
    (i) setting as a candidate cache segment the cache segment not in said power saving state that has the most cache locations storing non-evictable cached data;
    (ii) selecting from said candidate cache segment an invalid cache location;
    (iii) if (ii) is not possible, then selecting from said candidate cache segment a clean cache location storing evictable cached data;
    (iv) if (ii) and (iii) are not possible, then selecting from said candidate cache segment a dirty cache location storing evictable cached data;
    (v) if (ii), (iii) and (iv) are not possible, then setting as said candidate cache segment the cache segment not in said power saving state that has the next-most cache locations storing non-evictable cached data, and repeating steps (ii), (iii) and (iv);
    (vi) if (ii), (iii), (iv) and (v) are not possible, then controlling said power control circuitry to bring out of said power saving state a cache segment that is currently in said power saving state, and selecting as said candidate cache location an invalid cache location of the cache segment that has been brought out of said power saving state.

14. A data processing apparatus according to claim 5, wherein said eviction selection mechanism is configured to select cached data as said evictable cached data if said access monitoring mechanism determines that an interval since the last access to said cached data is greater than a predetermined threshold.

15. A data processing apparatus according to claim 14, wherein said access monitoring mechanism is configured to determine periodically whether or not said interval since the last access to said cached data is greater than said predetermined threshold.

16. A data processing apparatus according to claim 1, wherein:
   said data processing circuitry is configured to provide a signal to said eviction selection mechanism indicating that a subset of cached data will no longer be used by said data processing circuitry; and
   said eviction selection mechanism is responsive to said signal to select said subset of cached data as said evictable cached data.

17. A data processing apparatus according to claim 1, wherein said cache compacting mechanism is configured to perform said cache compaction periodically.

18. A data processing apparatus according to claim 1, wherein said cache compaction performed by said cache compacting mechanism is independent from said selection of evictable cached data by said eviction selection mechanism.

19. A data processing apparatus according to claim 1, wherein said cache compacting mechanism is configured to perform said cache compaction if said cache compacting mechanism identifies that eviction of said evictable cached data would allow said non-evictable cached data to be stored in fewer cache segments than are currently being used to store said cached data.

20. A data processing apparatus according to claim 1, wherein said cache compacting mechanism is configured to perform said cache compaction by executing the following steps:
   (i) identifying whether eviction of said evictable cached data would allow said non-evictable cached data to be stored in fewer cache segments than are currently being used to store said cached data; and
   (ii) if it is identified that eviction of said evictable cached data would allow said non-evictable cached data to be stored in fewer cache segments than are currently being used to store said cached data, then performing steps (a) to (e):
   (a) selecting as a source cache segment a cache segment having the fewest cache locations that are storing non-evictable cached data;
   (b) selecting as a destination cache segment a cache segment having the most cache locations that are storing non-evictable cached data;
   (c) evicting evictable cached data from said source cache segment and setting as invalid cache locations the cache locations from which said evictable cached data is evicted;
   (d) transferring at least a portion of said non-evictable cached data stored in said source cache segment to at least one cache location of said destination cache segment, each said at least one cache location being one of an invalid cache location of said destination cache segment and a cache location of said destination that is storing evictable cached data; and
   (e) repeating steps (a) to (e) until no more cached data can be transferred to another cache segment.

21. A data processing apparatus according to claim 1, wherein said data processing circuitry is configured to generate data, and when generated said data is initially stored in said cache memory.

22. A data processing apparatus according to claim 5, wherein said eviction selection mechanism, said cache compacting mechanism and said access monitoring mechanism are provided by at least one of:
   memory management circuitry for managing said cache memory and said memory;
   dedicated cache compacting circuitry for managing cache compaction;
   software algorithms executed by said data processing circuitry; and
   software algorithms executed by a management processor.

23. A data processing apparatus according to claim 1, wherein said cache memory comprises dynamic random access memory.

24. A data processing apparatus according to claim 23, wherein said memory comprises at least one of:
   dynamic random access memory having a lower static power consumption per amount of stored data than said dynamic random access memory of said cache memory;
   flash memory;
   magnetic random access memory; and
   phase change random access memory.

25. A data processing apparatus according to claim 1, wherein said cache memory and said memory are arranged in separate memory modules.

26. A data processing apparatus according to claim 1, comprising at least one hybrid memory module, each said hybrid memory module comprising a plurality of cache locations of said cache memory and a plurality of memory locations of said memory.

27. A data processing apparatus according to claim 26, wherein said hybrid memory module comprises a plurality of blocks, each block comprising at least some of said cache locations and at least some of said memory locations.

28. A data processing apparatus according to claim 26, wherein said hybrid memory module comprises a plurality of blocks, at least one of said plurality of blocks being a memory block dedicated to providing memory locations and at least one of said plurality of blocks being a cache block dedicated to providing cache locations.

29. A data processing apparatus according to claim 1, further comprising:
   an eviction status bit store for storing a plurality of eviction status bits, each eviction status bit being associated with a corresponding cache location of said cache memory and having an evictable state indicating that the corresponding cache location contains evictable cached data and a non-evictable state indicating that the corresponding cache location contains non-evictable cached data; and
   access monitoring circuitry for monitoring access to cache locations of said cache memory and maintaining said eviction status bits in said eviction status bit store; wherein:
   said access monitoring circuitry is configured to set all of said eviction status bits to said evictable state following cache compaction being performed by said cache compaction circuitry;
   said access monitoring circuitry, is responsive to a read to a read target location occurring within a read access window to set the eviction status bit corresponding to said read target location to said non-evictable state;

said access monitoring circuitry is responsive to a write to a write target location within a write access window to set the eviction status bit corresponding to said write target location to said non-evictable state; and said evictable cached data is cached data stored in cache locations for which the corresponding eviction status bit is in said evictable state when said cache compacting mechanism performs said cache compaction.

30. A data processing apparatus according to claim 27, wherein said eviction status bit store and said access monitoring circuitry are provided as part of a memory module that forms part of said cache memory.

31. A data processing apparatus according to claim 27, wherein said eviction status bit store includes an eviction status history store for storing a plurality of sets of eviction status history bits, each set of eviction status history bits having values corresponding to values of said eviction status bits at a respective instance in the past.

32. A data processing apparatus comprising:
data processing means for processing data;
memory means for storing data for use by said data processing means;
cache memory means for storing cached data from said memory means, said cache memory means comprising a plurality of cache segment means;
power supply means for selectively supplying each of said cache segment means with power;
eviction selection means for selecting evictable cached data for eviction from said cache memory means;
cache compacting means configured to perform cache compaction by evicting said evictable cached data from said cache memory means and storing non-evictable cached data in fewer cache segment means than were used to store said cached data prior to eviction of said evictable cached data; and
power control means configured, to control said power supply means to place in a power saving state at least one of said cache segment means that, following eviction of said evictable cached data by said cache compacting means, are not required to store cached data.

33. A method for a data processing apparatus comprising data processing circuitry for processing data, a memory for storing data for use by said data processing circuitry, and a cache memory comprising a plurality of cache segments and configured to store cached data from said memory; said method comprising the steps of:
selecting evictable cached data for eviction from said cache memory;
performing cache compaction by evicting said evictable cached data from said cache memory and storing non-evictable cached data in fewer cache segments than were used to store said cached data prior to eviction of said evictable cached data; and
placing in a power saving state at least one of said cache segments that, following eviction of said evictable cached data, are not required to store cached data.

* * * * *